Feb. 5, 1957     J. H. DICKSON     2,780,132
OPTICAL COMPARATOR
Filed March 10, 1953     5 Sheets-Sheet 1
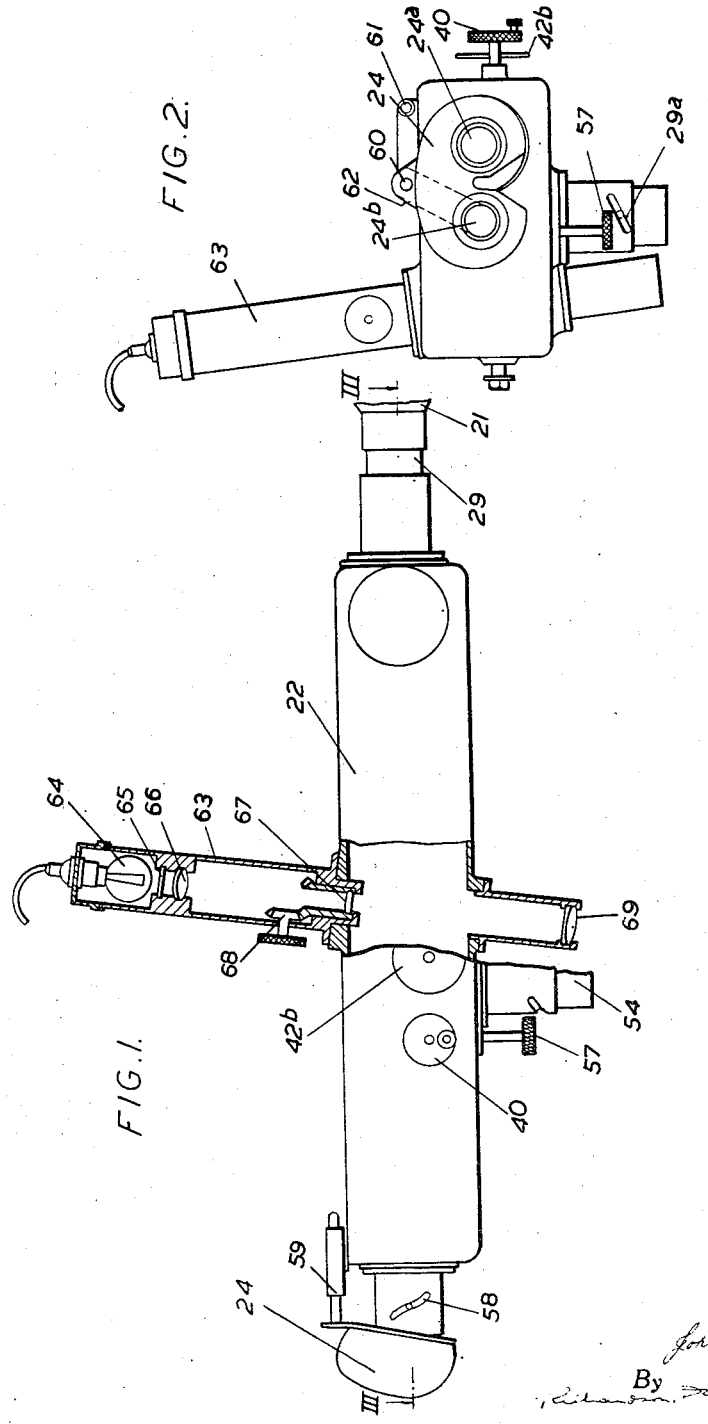
Inventor
John Howe Dickson
By
his Attorneys Feb. 5, 1957  J. H. DICKSON  2,780,132
OPTICAL COMPARATOR
Filed March 10, 1953  5 Sheets-Sheet 2
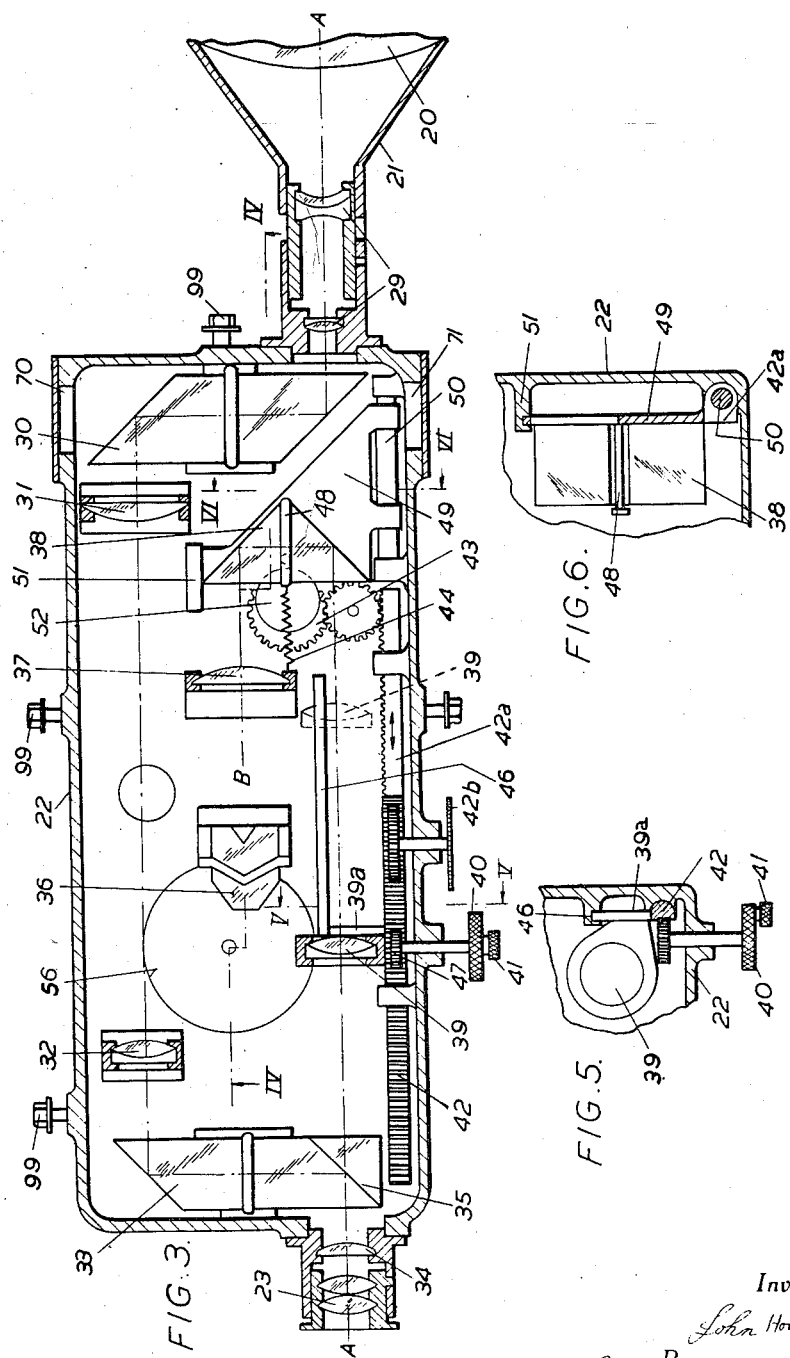
Inventor
John Horace Dickson
By
his Attorneys Feb. 5, 1957  J. H. DICKSON  2,780,132
OPTICAL COMPARATOR
Filed March 10, 1953  5 Sheets-Sheet 3
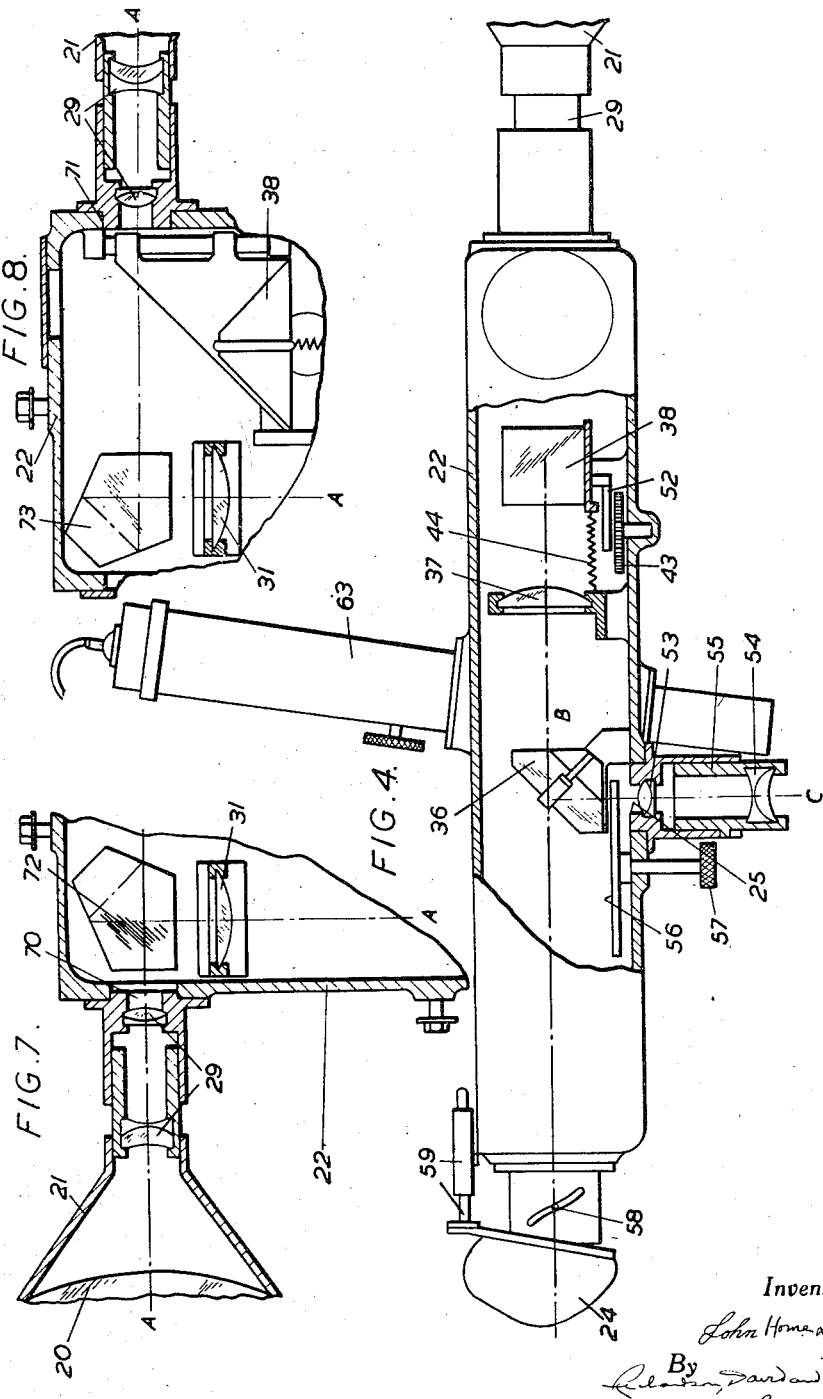
Inventor
John Home Dickson
By
his Attorneys.

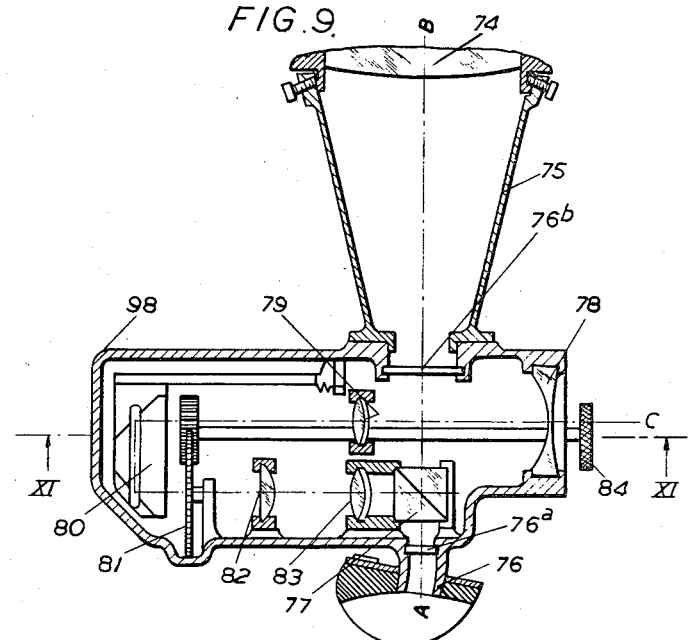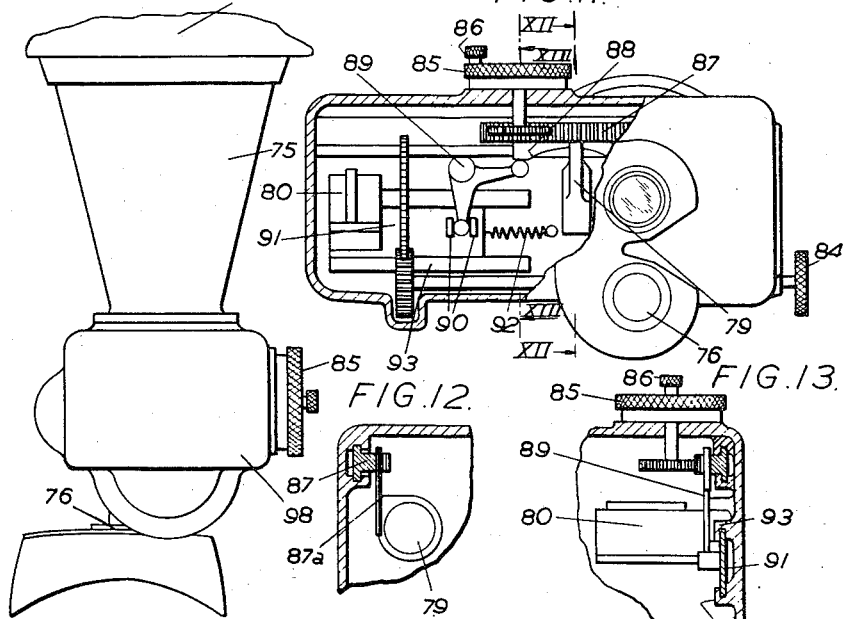

Feb. 5, 1957  J. H. DICKSON  2,780,132
OPTICAL COMPARATOR

Filed March 10, 1953  5 Sheets-Sheet 5

Inventor
John Home Dickson
By
Richardson, David and Norden
his Attorneys.

United States Patent Office 2,780,132
Patented Feb. 5, 1957

2,780,132

OPTICAL COMPARATOR

John Home Dickson, Teddington, England, assignor of one-third to Barr & Stroud Limited, Glasgow, Scotland, and one-third to John Buckingham, London, England Application March 10, 1953, Serial No. 341,570

Claims priority, application Great Britain March 14, 1952

5 Claims. (Cl. 88—14)

This invention relates to an optical viewing instrument.

It is known to use radar on board ships for providing a radar trace of the adjacent coast-line or other objects on a cathode ray tube, and in navigation or for other purposes it is necessary to compare this trace with a corresponding navigational chart, map or the like (hereinafter and in the claims referred to simply as "chart"). The present invention relates to an optical viewing instrument which facilitates the comparison of the radar trace and the chart. The radar trace is commonly described as the "plan position indicator" and gives a display or trace of the coast or other objects as viewed in plan from above; the term "plan position indicator" will hereinafter be referred to as "PPI." The invention is, of course, capable of use on vehicles other than ships, for example aircraft, but the invention will be described primarily as it is used on board ship.

The primary object of the invention is to provide, in the instrument, a telescopic optical system for viewing the chart.

The use of a large scale chart of clear detail is essential for close quarter navigation and since the PPI picks up objects spaced over a fairly wide area, it is desirable that a correspondingly wide area of the chart be brought to view at the eyepiece of the instrument. This is achieved by use of the chart-viewing telescope.

Another object of the invention is to provide a simple means for varying the magnification in the chart-viewing telescope to allow the relative scale of the images to be adjusted and simple means for automatically ensuring that the position of the final chart image is not altered when the magnification is varied.

The optical system for viewing the PPI image may be a simple system in which the image is viewed directly without lenses through a beam-splitting prism.

Furthermore, a variable light filter may be provided in the path of the rays from chart and/or PPI in order to balance the light intensity of the respective images.

I will now describe some embodiments of the invention simply by way of example with reference to the accompanying drawings whereon:

Fig. 1 is a side elevation, partly broken away in section, of a viewing instrument in accordance with the invention.

Fig. 2 is a front elevation corresponding to Fig. 1.

Fig. 3 is a sectional plan view on the line III—IIII of Fig. 1 but with the headrest removed.

Fig. 4 is an elevation corresponding to Fig. 3 partly in section along the line IV—IV, Fig. 3.

Fig. 5 is a sectional elevation on the line V—V of Fig. 3 of a detail.

Fig. 6 is an elevation on the line VI—VI of Fig. 3 of a further detail.

Figs. 7 and 8 are detailed sectional plans corresponding to Fig. 3 but showing modified arrangements for mounting the PPI respectively on the left-hand side or right-hand side of Fig. 3 instead of as shown in Fig. 3.

Fig. 9 is a sectional plan view of a modified form of viewing instrument in accordance with the invention.

Fig. 10 is an elevation of Fig. 9.

Fig. 11 is an elevation corresponding to Fig. 9 but partly in section on the line XI—XI, Fig. 9.

Figs. 12 and 13 are fragmentary sectional views on the ilnes XII—XII and XIII—XIII of Fig. 11.

Figure 14:
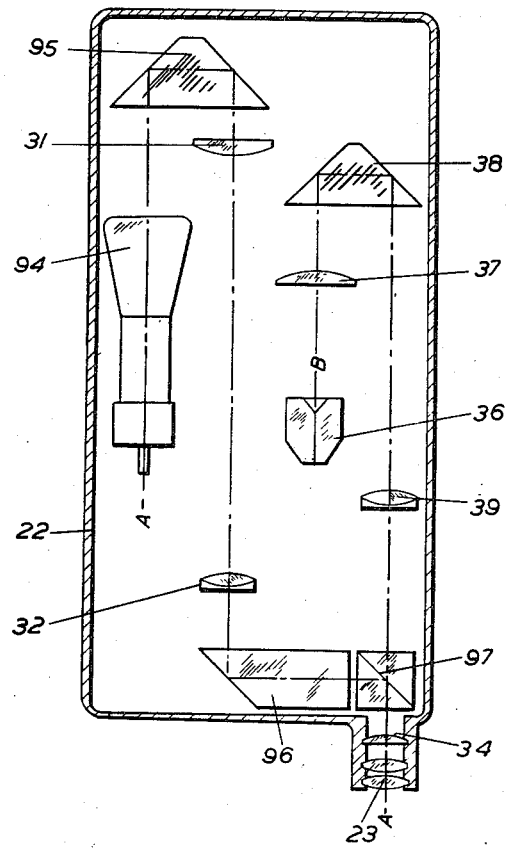
Fig. 14 is a diagrammatic sectional plan of the optical system of a modified viewing instrument in which the PPI is housed within the casing of the instrument.

Referring to the arrangement shown in Figs. 1 to 8 and referring particularly to Figs. 3 and 4, the PPI 20 is screened at 21 to exclude undesired light and is mounted on one end of a casing 22 at whose remote end is the eyepiece 23, provided with a head rest 24 (Fig. 4). The chart is disposed vertically below casing 22 and light therefrom enters the casing through a window 25, and a light filter 56. The light rays from the PPI are transmitted to the eyepiece along the path A—A (Fig. 3), while the light rays from the chart pass upwards through 25 and 56 along the path B—A to the eyepiece.

The optical system for viewing the image of the PPI comprises objective lenses 29, prism 30, collector lens 31, projector lens 32, prism 33 and field lens 34.

The upcoming rays from the chart enter through lenses 54, 53 and pass through roof prism 36 to collector lens 37, prism 38 and adjustable projector lens 39, entering the eyepiece 23 also through beam-splitting prism 33, which is formed with a transmitting-reflecting surface at 35 comprising an interference filter on a reflecting surface. The surface at 35 transmits the rays B—A and reflects the rays A—A each into the common eyepiece, and for this purpose built up alternate thin films of high-index and low index dielectric materials are deposited thereon under high vacuum. In the present example the surface is faced with two groups of layers separated by a thin balsam film. This arrangement enables light lost due to absorption to be kept to a negligible value of about two percent as compared with a loss of up to thirty-five percent in the metal films of semi-silvered mirrors.

As the scales of the images of the PPI and chart may both vary, it is necessary to reduce them to a common scale in the eyepiece so that the markings thereon may be viewed in exact coincidence, and this is effected by varying the magnification of the light rays in the line B—A from the chart by longitudinally adjusting the position of lens 39. This lens is moved by means of a hand wheel 40 having a clamping screw 41 and which through pinion 47 moves rack 42 carrying the lens. When the magnification at the eyepiece is varied, it is necessary simultaneously to change the length of path in the optical system to ensure that the position of the focal plane of the chart image at the eyepiece is not altered, otherwise the image would be unclear; this is done by simultaneously causing prism 38 to move by means of sideways facing teeth at rack extension 42a engaging gearing 43 carrying cam or eccentric 52 which moves the prism against the influence of spring 44. As shown in Fig. 5, lens 39 is mounted on a lateral extension 39a of the rack 42 and bears in an upstanding guide 46.

As shown in Fig. 6, prism 38 supported in its mounting 48 is carried on a laterally projecting plate 49 slidable on a longitudinal guide 50 and borne at its outer edge in an upstanding guide 51.

As shown in Fig. 4, the upcoming rays from the chart pass through objective lenses 53, 54 the latter mounted in an axially adjustable sleeve 55 to compensate for variation in height of the chart table, and then to roof prism 36 through a variable light filter 56 in the form of a horizontal glass disc having a transluscent coating whose density varies around its suface, so that by thumb grip 57 it may be turned in order to filter the light from the chart to the required degree to balance the chart illumination with the PPI illumination as viewed in eyepiece 23.

The eyepiece 23 is also axially adjustable for focusing, and by means of a pin and helical slot arrangement 58 (Figs. 1 and 4), and a sliding guide 59 the headrest 24 is displaced correspondingly.

Referring to Fig. 2, the headrest 24 is provided with two viewing apertures 24a, 24b, and it may be moved between two positions represented by sockets at 60, 61, respectively, while a pivotal blinker 62 is shown in position blanking off the left-hand aperture 24b so that the observer's right-hand eye can view through aperture 24a and eyepiece 23. By withdrawing the head rest from socket at 60 and moving the whole to the right (Fig. 2) so as to engage the socket at 61, the aperture at 24b is brought into register with eyepiece 23 and the blinker 62 is then pivoted so as to blank off the aperture 24a.

A dial 42b is geared to rack 42 so as to indicate the setting of the lens 39.

An optical projection system as shown at 63 (Fig. 1) is provided for the purpose of projecting a spot of light on to the chart to constitute an optical pointer showing the ship's position and heading thereon. This comprises a lamp 64, light filter 65, condenser lens 66, graticule 67 externally adjustable through bevel gear 68, and an objective lens 69. This arrangement projects a spot of light through the graticule on to the chart at a position vertically below window 25. The graticule preferably is a marking with a little pointer thereon indicating the direction or heading of the ship and this direction may be adjusted through gearing 68.

The position of the light spot relative to window 25 may be varied by adjustment of lens 69 transversely of the axis thereof. For example, it may be mounted between three adjustable screws set 120° apart. This arrangement enables correct alignment of the spot with varying heights of chart table.

Depending upon the location of the instrument and the PPI it may be desired alternatively to attach the PPI to the casing 22 on one or other side, instead of at the end as shown in Fig. 3. For this purpose, two openings are provided in the casing at 70, 71, being provided with removable cover plates. If opening 70 is used the arrangement is as in Fig. 7, in which like references indicate like parts to those of Fig. 3, but a pentagonal prism 72 is provided to direct the rays from the PPI along the axis A—A.

To utilise the opening 71 the Fig. 8 arrangement is used (like references indicating like parts to those of Fig. 3) and in this case a pentagonal prism 73 is provided to direct the rays along the axis A—A. Prisms 72, 73 may be the same prism oriented in different directions.

The prisms 48, 72 and 73 may thus be interchangeably mounted in the instrument so as to facilitate easy conversion for the different orientations of PPI.

In operation, the chart is placed below the instrument and the wheel 40 is turned so as to adjust the magnification of the chart image to superimpose same on the image of the PPI and bring its scale into correspondence therewith, whereby corresponding parts of the images coincide. The spot of light from projector 63 shows the position of the ship on the chart, and as the ship moves the chart is moved accordingly relative to the instrument by any conventional means normally provided for chart movement, thereby to maintain coincidence between the images of the chart and PPI in the eyepiece.

Interchangeable optical parts may be provided at 29 to enable PPI displays of different sizes to be viewed. For example PPI's may vary in diameter between five and fifteen inches. Moreover, adjustment, for example by helical pin and slot (shown at 29a, Fig. 2) may be provided for the focussing of the objective lens 54.

To enable the instrument to be easily swung into and out of position, it may be supported on the ship's structure by adjustable links engaging clamp bolts 99 (Fig. 3).

The instrument is simple to install and operate, and normally only two operating heads or wheels are used; that for adjusting the magnification of the chart as at 40 in Fig. 3, and that of varying the relative illumination of the two images, such as filter 56 in Fig. 4.

The normal method of operation is as follows:

The calibration pips or echo markings of the cathode ray tube are switched on at the PPI and concentric circles of equal and known increments of radius thereby appear on the display. Circles representing the same distances are drawn on the chart at its scale, say round the compass rose. The chart is then moved into position under the instrument so that the respective centres of the two sets of circles coincide. By operation of the variable magnification head 40 the chart circles are now made to superimpose coincidently on the PPI circles. The head 40 can now be clamped in position by its clamp screw and the calibration pips switched off. The instrument is then ready for use.

In the arrangement shown in Figs. 9 to 13, the PPI 74 is shrouded by a screen 75 and its image is viewed along A—B directly from the eyepiece 76 through windows 76a, 76b and beam-splitting prism 77 having a transmitting-reflecting surface similar to that at 35 in Fig. 3, the rays otherwise passing directly to the eye of the observer thus not being deviated or changed in direction.

The rays from the chart pass along the axis C—A through fixed lens 78 adjustable lens 79, adjustable prism 80, rotary filter 81 and lenses 82, 83 to the prism 77. Handwheel 84 is connected to filter 81 having a variable density of filtering medium thereon as aforesaid, so that by turning the same the illumination of the PPI and chart image can be balanced.

Wheel 85 (Fig. 11) adjusts the position of lens 79 in order to vary the magnification of the chart image for the reasons aforesaid, the position of the prism 80 simultaneously being adjustable to maintain the focal plane of the image at the eyepiece. The mechanism for showing this can be more clearly seen in Figs. 11 to 13.

Wheel 85, provided with clamp screw 86, actuates rack 87 having a lateral cam surface 88 on which bears one arm of a bellcrank lever 89, the other end engaging between two fingers 90 of a slide 91 carrying prism 80 and being mounted in upstanding guides 93. Thus by moving the rack 87 to and fro the prism is moved, while spring 92 maintains the mechanism in close contact. As shown in Fig. 12, lens 79 is simultaneously moved by being mounted on the said rack 87 by means of a lateral arm 87a thereon.

The arrangement shown in Figs. 9 to 13 is considerably more compact than that shown in Fig. 3 and involves a simple optical system for the PPI, but on the other hand it necessitates a very careful lens design to minimise differential comparative distortion as between the simple optical system B—A and the more complex one C—A.

The arrangement shown in Fig. 14 has an optical system similar to that shown in Fig. 3, and like references indicate like parts, 94 indicating the cathode ray tube of the PPI which is disposed within the casing 22 of the instrument instead of being separate and external as in Fig. 3. A—A indicates the path of the rays from the PPI to the eyepiece, while B—A indicates the path of the rays from the chart to the eyepiece. A right-angled prism 95 is, however, provided instead of prism 30, while lens 39 and prism 38 are adjustable as before.

Figure 15:
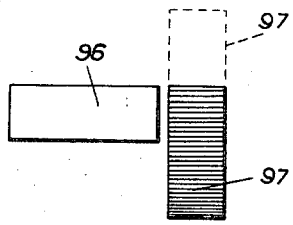
Fig. 15 is a diagrammatic elevation of a detail in Fig. 14.

The prism 33 with the beam-splitting surface at 35 of Fig. 3 is moreover replaced by a different prism 96 and a separate prism 97, the latter having a beam-splitting surface which has a transmitting-reflecting coating thereon similar to that described with reference 35 but of varying density, as indicated by the varying spacing of the lines in Fig. 15. By adjusting the position of this prism 97 transversely of the light beam, as indicated in dotted lines, a different proportion of light reflected as against a uniform proportion of light transmitted can be obtained in order to balance the illumination of the chart and PPI at the eyepiece.

Variation of the magnification of the light rays from the PPI may be effected in similar manner to that indicated above as well as variation in the magnification of the rays from the chart. It may be advantageous to have both light rays variable, for example where the respective scales of PPI and chart are such that it is desirable to magnify the PPI image and minify the chart image.

I claim:

1. Optical comparator apparatus for presenting individual images of two spaced objects arranged in superposed relationship for viewing and comparison, said apparatus comprising: a light-proof housing adapted to be mounted in spaced relationship with respect to one of said objects, both of said objects being viewable from within said housing; beam-splitting means comprising an elongated partially reflective surface of progressively varying light transmitting and reflecting properties intermediate its ends, said surface being disposed in said housing for presenting individual images of both of said objects arranged in superposed relationship; an eyepiece mounted on said housing and communicating with the interior thereof, said eyepiece being directed toward said beam-splitting means for viewing said superposed images; a first optical system at least partially disposed in said housing and directing an image of one of said objects to said beam-splitting means; a second optical system at least partially disposed in said housing and directing an image of the other of said objects to said beam-splitting means, said beam-splitting means being movable in the longitudinal direction of said surface for equalizing the relative intensities of illumination of said images and continuously adjustable focusing means of variable magnification included in one of said optical systems, said focusing means comprising optical path length adjusting means for maintaining the image directed by the optical system in which it is included disposed at a fixed plane throughout the range of adjustability of said focusing means with the object of which an image is produced by said last-named optical system maintained fixedly positioned.

2. Optical comparator apparatus for presenting individual images of two spaced objects arranged in superposed relationship for viewing and comparison, said apparatus comprising: a light-proof housing adapted to be mounted in spaced relationship with respect to one of said objects, both of said objects being viewable from within said housing; beam-splitting means disposed in said housing for presenting individual images of both of said objects arranged in superposed relationship; an eyepiece mounted on said housing and communicating with the interior thereof, said eyepiece being directed toward said beam-splitting means for viewing said superposed images; a first optical system at least partially disposed in said housing and directing an image of one of said objects to said beam-splitting means; a second optical system at least partially disposed in said housing and directing an image of the other of said objects to said beam-splitting means; continuously adjustable focusing means of variable magnification included in one of said optical systems, said focusing means comprising optical path length adjusting means for maintaining the image directed by the optical system in which it is included disposed at a fixed plane throughout the range of adjustability of said focusing means with the object of which an image is produced by said last-named optical system maintained fixedly positioned, means defining a light-proof passage extending through said housing, said passage being directed to transmit light toward one of said objects, light source means communicating with said passage and disposed to transmit light therethrough, and means included in said passage for projecting an index mark on said one of said objects.

3. Optical comparator apparatus according to claim 2, wherein said beam-splitting means comprises an elongated partially reflective surface of progressively varying light transmitting and reflecting properties intermediate its ends, said beam-splitting means being movable in the longitudinal direction of said surface for equalizing the relative intensities of illumination of said images.

4. Optical comparator apparatus for presenting individual images of two spaced objects arranged in superposed relationship for viewing and comparison, said apparatus comprising: a light-proof housing adapted to be mounted in spaced relation with respect to one of said objects, said one object being viewable from within said housing and the other of said objects being the screen of a cathode ray tube disposed within said housing; beam-splitting means disposed in said housing for presenting individual images of both of said objects arranged in superposed relationship; an eyepiece mounted on said housing and communicating with the interior thereof, said eyepiece being directed toward said beam-splitting means for viewing said superposed images; a first optical system at least partially disposed in said housing and directing an image of one of said objects to said beam-splitting means; a second optical system at least partially disposed in said housing and directing an image of the other of said objects to said beam-splitting means; continuously adjustable focusing means of variable magnification included in one of said optical systems, said focusing means comprising optical path length adjusting means for maintaining the image directed by the optical system in which it is included disposed at a fixed plane throughout the range of adjustability of said focusing means with the object of which an image is produced by said last-named optical system maintained fixedly positioned, means defining a light-proof passage extending through said housing, said passage being directed to transmit light toward one of said objects, light source means communicating with said passage and disposed to transmit light therethrough, and means included in said passage for projecting an index mark on said one of said objects.

5. Optical comparator apparatus according to claim 4, wherein said beam-splitting means comprises an elongated partially reflective surface of progressively varying light transmitting and reflecting properties intermediate its ends, said beam-splitting means being movable in the longitudinal direction of said surface for equalizing the relative intensities of illumination of said images.

References Cited in the file of this patent

UNITED STATES PATENTS

| | | |
|---|---|---|
| 858,213 | Reese | June 25, 1907 |
| 1,116,069 | Jacob | Nov. 3, 1914 |
| 1,319,292 | Kunz | Oct. 21, 1919 |
| 1,723,623 | Kennedy | Aug. 6, 1929 |
| 2,404,770 | Bennett et al. | July 30, 1946 |
| 2,536,718 | Brandon | Jan. 2, 1951 |
| 2,555,402 | Field | June 5, 1951 |
| 2,621,555 | Fleming et al. | Dec. 16, 1952 |

FOREIGN PATENTS

| | | |
|---|---|---|
| 21,086 | Great Britain | Sept. 25, 1911 |
| 519,940 | Great Britain | Apr. 10, 1940 |
| 645,619 | Great Britain | Nov. 1, 1950 |